O. B. POTTER.
SHOW-WINDOW.
No. 172,485. Patented Jan. 18, 1876.
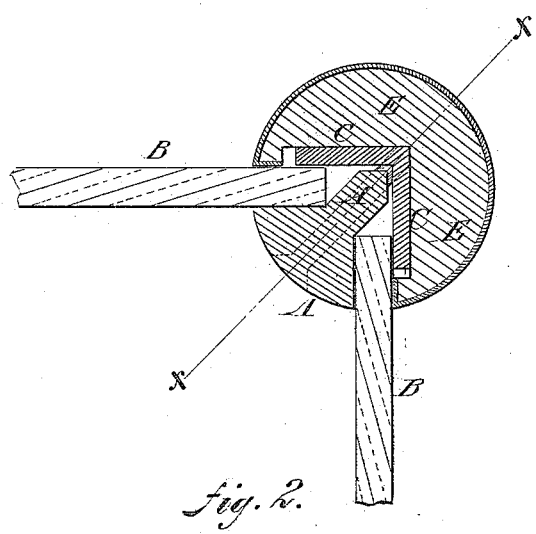
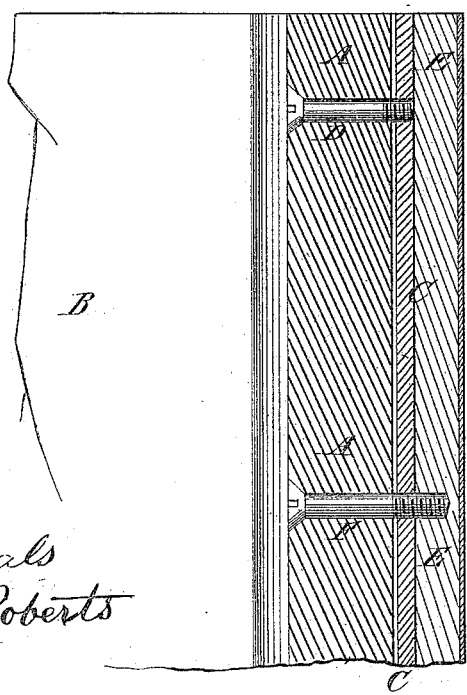

UNITED STATES PATENT OFFICE.

ORLANDO B. POTTER, OF NEW YORK, N. Y.

IMPROVEMENT IN SHOW-WINDOWS.

Specification forming part of Letters Patent No. 172,485, dated January 18, 1876; application filed January 3, 1876.

*To all whom it may concern:*

Be it known that I, ORLANDO B. POTTER, of the city, county, and State of New York, have invented a new and useful Improvement in Show-Windows, of which the following is a specification:

Figure 1 is a detail cross-section of a portion of a show-window illustrating my invention. Fig. 2 is a detail vertical section of the same, taken through the line $x\ x$, Fig. 1.

Similar letters of reference indicate corresponding parts.

The object of my invention is to facilitate the removal of the ordinary outside ornamental moldings of show-windows, for the purpose of repair or replating without disturbing the window-sash or the glass plates of the window.

My invention consists in the combination of a clamping-bar with the ordinary stile and the ordinary exterior molding of the window, substantially as hereinafter described.

As show-windows are ordinarily constructed the ornamental moldings are attached directly to the sash-stiles, and cannot be removed without disturbing the glass, and when removed cannot be put back, but have to be replaced with new ones. These moldings are frequently covered with plated metal, which soon becomes tarnished by exposure to the weather, and has to be frequently cleaned and polished, so that the plating is soon destroyed, and has to be renewed. These difficulties I remedy in the manner hereinafter set forth.

A represents the usual stile of the sash or frame, to which the glass B is applied. C is a light bar or plate, made of metal or other suitable material; but metal is preferred, and which is attached to the outer edge of the stile or sash-bar A, so as to overlap the edges of the glass B. The bar or plate C is secured to the stile A by screws D passing through said stile from the inner side, and screwing into the said plate C, as shown in Fig. 2. E represents the molding, which, in the drawings, is represented as being made of wood covered with a strip of plated metal, but which may be made wholly of metal, wood, or other material, if desired. The molding E is grooved or recessed upon the inner side to receive the bar or plate C, so that the said bar or plate may be entirely covered and concealed. The molding E is secured in place by screws F, passing through the stile A from the inner side through the bar or plate C, and screwing into the molding E, as shown in Fig. 2.

In the drawings the invention is represented as being applied to the angle of a window; but the construction is the same where the glass plates B are in the same plane. By this construction, by removing the screws F the moldings E can be detached without disturbing the glass or exposing it to any liability of falling out, enabling the molding to be conveniently replated or renewed without affecting the integrity of the window.

Having thus described my invention, I claim as new and desire to secure by Letters Patent—

The combination of the clamping-plate C with the stile A and exterior molding E, substantially as shown and described.

O. B. POTTER.

Witnesses:
T. B. MOSHER,
ALEX. F. ROBERTS.